United States Patent [19]
Rindal

[11] Patent Number: 5,157,308
[45] Date of Patent: Oct. 20, 1992

[54] METHODS AND APPARATUS FOR REDUCING ELECTROMAGNETIC INTERFERENCE EMISSION FROM A CATHODE RAY TUBE VIDEO DISPLAY SYSTEM

[75] Inventor: Abraham E. Rindal, Dunedin, Fla.

[73] Assignee: Sun Microsystems, Inc., Mountain View, Calif.

[21] Appl. No.: 741,782

[22] Filed: Aug. 6, 1991

[51] Int. Cl.⁵ .............................................. H01J 29/00
[52] U.S. Cl. ........................................ 315/85; 358/36
[58] Field of Search ........................... 315/10, 85, 381; 358/36, 12

[56] References Cited

U.S. PATENT DOCUMENTS

| | | |
|---|---|---|
| 4,521,803 | 6/1985 | Gittinger ................................ 358/12 |
| 4,634,930 | 1/1987 | Toshiyasu et al. ............... 315/85 X |
| 4,950,955 | 8/1990 | Hoover et al. ................... 315/85 X |

Primary Examiner—Robert J. Pascal
Attorney, Agent, or Firm—Blakely, Sokoloff, Taylor & Zafman

[57] ABSTRACT

Video signals for each primary color are delayed in time relative to every other primary color video signals. When displayed on a cathode ray tube ("CRT") display, the time delayed video signals will result in a separated color pattern for each image displayed. Separated color images are subsequently realigned through use of electron beam deflection controls affecting the horizontal and vertical displacement of electron beams for each color. Measurement of EMI at a far field point varies between zero (no EMI) and no reduction in measurable EMI, depending on the frequency of the video signals and the amount of time delay induced therein. In alternative embodiments, time shifting of video signals may be accomplished either by discrete filter components, simple propagation delay lines.

39 Claims, 3 Drawing Sheets

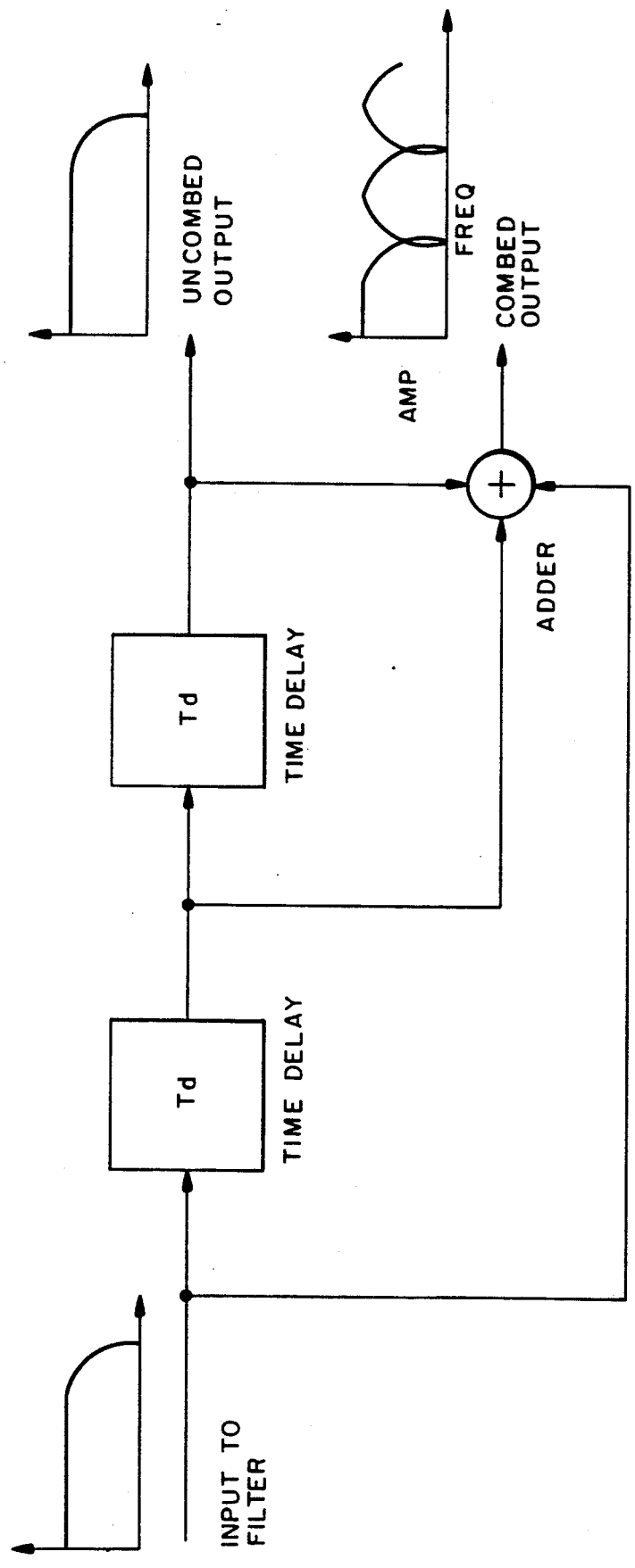
FIG_1  COMB FILTER BLOCK DIAGRAM  (PRIOR ART)

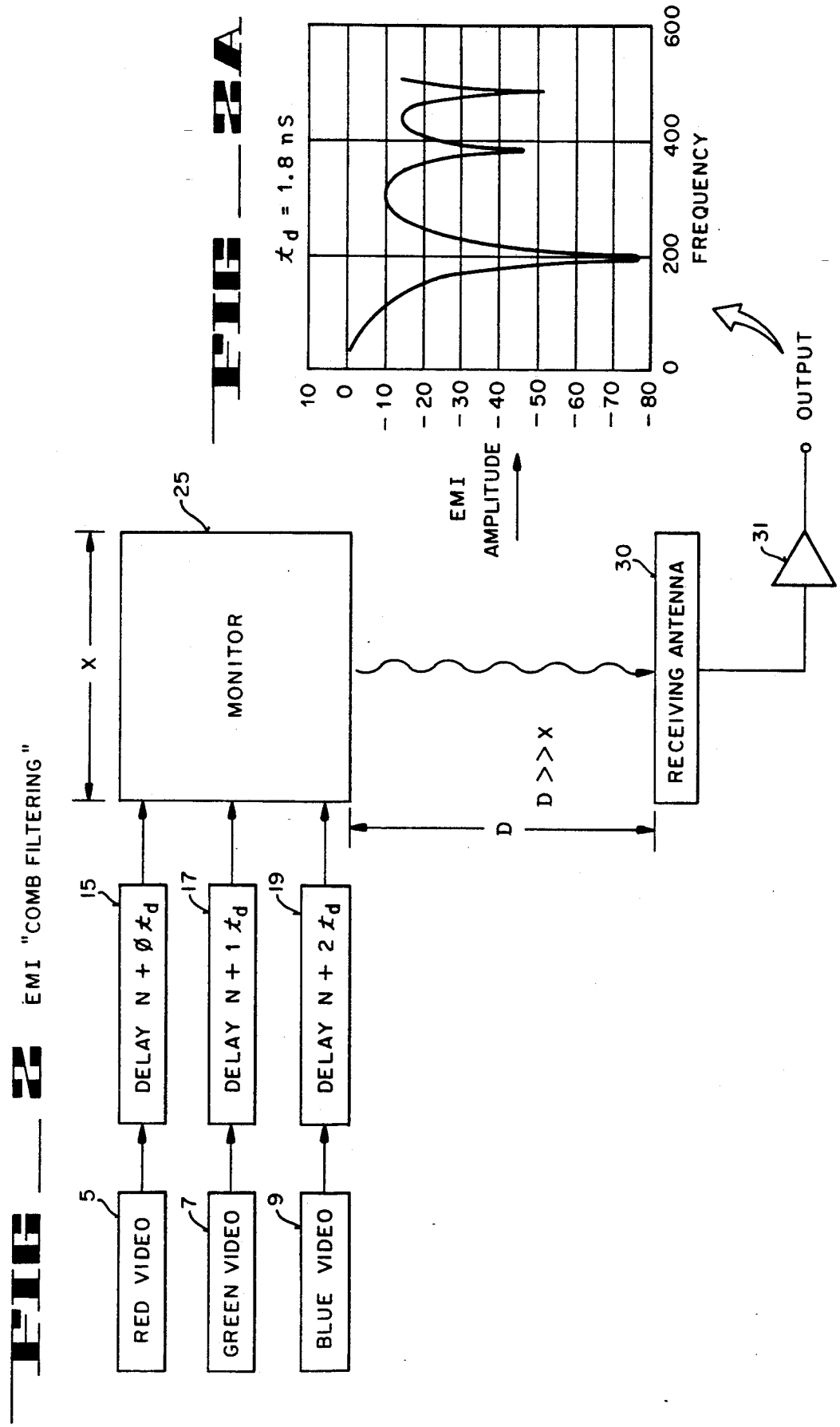

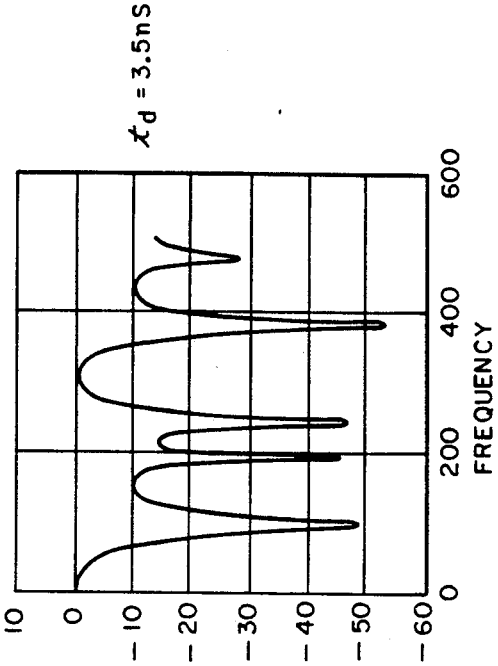
FIG 3B $t_d = 2.5$ nS
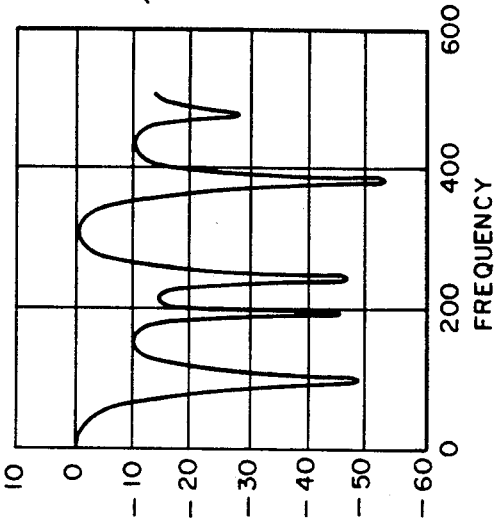
FIG 3D $t_d = 3.5$ nS
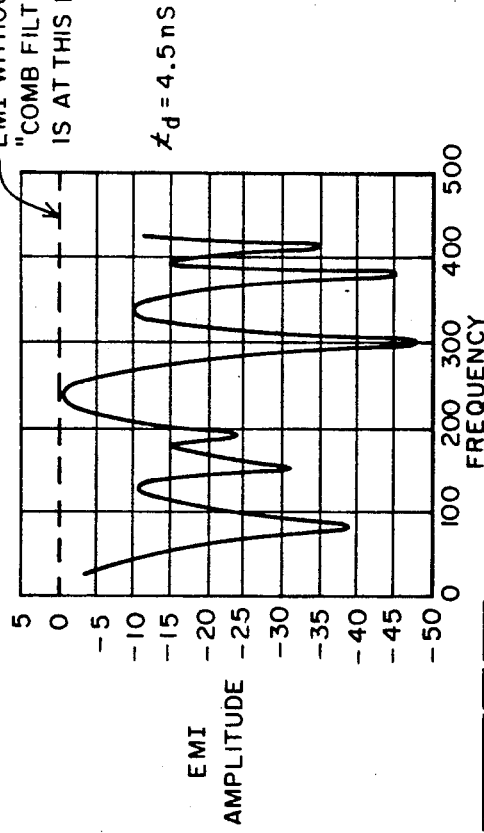
FIG 3A EMI FREQUENCY RESPONSE SPECTRA
$t_d = 4.5$ nS
EMI WITHOUT "COMB FILTER" IS AT THIS LEVEL
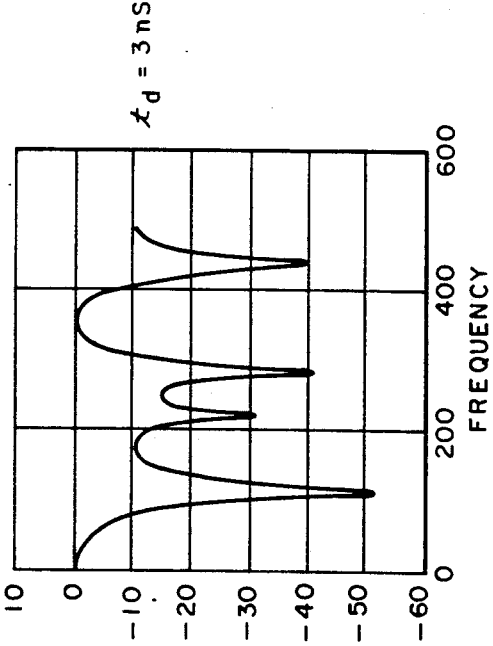
FIG 3C $t_d = 3$ nS

METHODS AND APPARATUS FOR REDUCING ELECTROMAGNETIC INTERFERENCE EMISSION FROM A CATHODE RAY TUBE VIDEO DISPLAY SYSTEM

BACKGROUND OF THE INVENTION

1. Field of the Invention

The present invention relates to video display systems, and more particularly relates to the reduction of electromagnetic interference ("EMI") emission from video display systems employing cathode ray tube ("CRT") displays.

2. Art Background

A. CRT Monitor Background

In a conventional CRT video display monitor, images are formed by scanning a beam of electrons across a photon emitting surface according to an input video signal. In a color CRT display, three primary color video signals drive three primary color electron guns, each gun emitting a stream of electrons which subsequently impinges on its particular color phosphor. Brightness of individual phosphors is controlled by the number of electrons impinging on that phosphor according to the input video signal for that color. In conventional CRT color displays, color images are formed by the composition of light emitted by individual red, green, and blue phosphors, which when viewed from a distance, appear to form a full color image. In a color CRT display, electrons from the red cathode, or electron gun, are accelerated towards the CRT screen by the high voltage of the anode. When the electrons emitted from the red cathode strike a red phosphors, red light is emitted. Electron beam deflection plates around the neck of the CRT deflect the electrons from the red cathode such that the electrons strike only the red phosphors. The deflection can be achieved by fixed permanent magnets, electromagnets, or by electrostatic deflection coils. Similarly, green and blue light is created when electrons from the green and blue electron guns are accelerated towards the CRT screen by the high voltage of the anode, whereupon they strike the green and blue phosphors respectively.

The position of an object to be displayed on the CRT screen is a function of both the amount of deflection of the electron beam for each primary color comprising the color image and the time when the video signal appears at the video input to the display. Each variable is independent of the other. Changing the amount of deflection of the electron beam will move all images of the color pertaining to that electron beam simultanesouly. Changing the time when a video signal comprising an object to be displayed on the screen appears at the video input will result in movement of only that object. Because the electron beams for all primary colors red, green and blue scan from top to bottom and from left to right, video signals for an object that occurs later in time will appear either further to the right or lower to the bottom of the CRT display relative to another object occurring earlier.

B. Electromagnetic Interference ("EMI") Background

Electromagnetic Interference, or EMI, may derive from several sources. Each component part of a video display system contributes a portion of the total EMI generated by the entire video display system. For example, a video generator generally must be equipped with some openings for cooling ventilation, which results in some radio frequency ("RF") radiation escaping from the video generator enclosure. Additionally, internal digital logic operating at 5 volt peak-to-peak signal levels contribute to the total EMI, although the final video output from the video generator is typically only 0.7 volts peak-to-peak. The video generator is connected to other component parts of the video display system including the CRT display, via cabling. To the extent that cables are unshielded, RF energy will radiate from the cable further contributing to the measurable EMI for the display system.

The greatest contributor to total EMI for video display system is the video monitor. Principally, the signal level operating within the electron gun cathodes is more that 50 times the signal level within the interconnecting cabling. The magnitude of EMI generated is directly proportional to amplitude of the source signal. Thus, the video monitor, with a substantially higher signal level, will contribute a substantially higher proportion of the total EMI. Additionally, because of the higher power consumption and dissipation within the monitor, there is an increased need for cooling ventilation, requiring additional ventilation openings and/or fans to move air through the monitor enclosure. Finally, because the CRT screen must be "open" to permit viewing the display, EMI emissions will be higher than if the CRT electron guns and accelerating anode were entirely enclosed. Some shielding may be provided within a CRT display, but generally compromise is required resulting in measurable EMI emission from the display screen. Shielding and filtering are commonly used and well known techniques in the art for reducing EMI emissions in display monitors. In the prior art, every radiating circuit is placed within singly or multiply shielded metal enclosures. Moreover, every wire which passes from the shielded component to the outside environment must be filtered using RLC circuits or other dissipative elements such as ferrite chokes, depending on the frequency of the radiating mechanism. Typically, AC power lines and user controls must be filtered in accordance with the above methods. Depending on the permissible levels of EMI for a particular application, reduction of EMI with known filtering and shielding techniques can result in significant added expense to the cost of the CRT display used in a video display system.

C. Comb Filter Background

In conventional electrical filters, attenuation of a signal is dependent upon the frequency of the signal being filtered. Such conventional filters are implemented with frequency dependent components such as capacitors and inductors. For example, a low pass filter employing a capacitor and a resistor will permit frequency components below the cutoff frequency to pass unattenuated, and will attenuate signal components above the cut off frequency. Alternatively, another type of frequency dependent filter known in the prior art is a transversal filter. A transversal filter consists of a delay line with signal taps at various points along the delay line, as shown in FIG. 1. The transversal filter relies upon the propagation time delay for a signal transmitted along the line to provide the frequency discrimination function within the filter. For example, assume a signal is applied to a 2 microsecond delay line having taps at the midpoint and at the end. Where the taps are added together in a summing network, the output will be a composition of the signals derived from the mid point tap and the terminal tap. If a 1 MHz sine wave is applied to the input of the delay line, because the period of a 1 MHz sine wave is 1 microsecond, the phase of the input signal at the first tap is exactly the same as the phase of the signal at the second, or terminal, tap at the end of the two microsecond delay line. When the two taps are summed together, the output signal will be the same phase as the input signal with twice the amplitude. If, instead, a 500 KHz signal is applied to the input of the delay line, because the period of the 500 KHz signal is 2 microseconds, the signal at the first tap is 180 degrees out of phase with the signal at the end of the delay line. Summing the signal at the first tap and at the terminal tap results in a zero output from the summing network. Accordingly, if input signals of all possible frequencies are applied to the input of the filter, a series of nulls will be seen at 500 KHz, 1.5 MHz, 2.5 MHz, 3.5 MHz etc., where the signals taken from the first tap and from the terminal tap are exactly out of phase. Conversely, at 1 MHz, 2 MHz, 3 MHz, etc., the output signal will be at a maximum because the signals taken from the first tap and the terminal tap are exactly in phase. The result shown in FIG. 1 is a response spectrum which has the appearance of a comb, hence the term "comb" filter, where the "teeth" are the nulls of the filter. Depending on the number of taps in the delay line, the number of nulls and the frequency at which nulls occur will vary. A representative discussion of comb filters is given in Bensen, *Television Engineering Handbook* 13:149–152 (1986).

As will be discussed below, the present invention provides simple, inexpensive, yet effective apparatus and methods for reducing the EMI emitted from a CRT display by time delaying the component color video signals comprising a video image to be displayed. Introduction of time delayed video signals in turn introduces signal nulls depending on frequency of the video signals comprising the video image, resulting in lower overall EMI emission for the CRT display.

SUMMARY OF THE INVENTION

Methods and apparatus for reducing electromagnetic interference ("EMI") produced by color cathode ray tube ("CRT") video display systems are disclosed. The video display system further includes video generators for each of three primary colors. For a three color primary color video system, one primary color is chosen to be an undelayed reference. A length of shielded coax cable connects each primary color video generator and the CRT. Each coax cable is of a unique length. The undelayed reference primary color video generator is connected to the CRT via a first shielded coax cable. A second shielded coax cable is inserted between the secondary primary color video generator and the CRT. Finally, a third shielded coax cable is inserted between the third primary color video generator and the CRT. The propagation delays of the differently dimensioned coax cables induce time delays and phase delays between constituent primary color video signals. When displayed on a CRT, the delayed video signals will be delayed in both time and space relative to the undelayed or reference primary color video signal. Separated color images are subsequently realigned through use of existing electron beam deflection controls on the CRT which control the horizontal and vertical displacement of electron beams for each primary color. Measurement of EMI at a point whose distance from the CRT is much greater than the CRT screen dimension varies between substantial attenuation and no measurable reduction in EMI, depending on the frequency of the primary color video signal and the amount of propagation time delay induced by each of the coax cables.

BRIEF DESCRIPTION OF THE DRAWINGS

The objects, features, and advantages of the present invention invention will be apparent in the following detailed description in which:

FIG. 1 illustrates the prior art method of comb filtering a signal to produce a series of frequency-dependent nulls.

FIG. 2 illustrates a block diagram illustration of a color CRT display system employing a multiplicity of delay modules.

FIG. 2A illustrates a representative EMI emission from a CRT employing the EMI reduction system shown in FIG. 2.

FIGS. 3A–3D illustrate resultant EMI emission frequency spectra for varying time delays induced in component video signals.

DETAILED DESCRIPTION OF THE INVENTION

Methods and apparatus for reducing electromagnetic interference ("EMI") emission from cathode ray tube ("CRT") video display systems is disclosed. In the following description for purposes of explanation, specific numbers, materials and configurations are set forth in order to provide a thorough understanding of the present invention. However, it will be apparent to one skilled in the art that the present invention may be practised without these specific details. In other instances, well known systems are shown in diagrammatical or block diagram form in order not to obscure the present invention unnecessarily.

Referring to FIG. 2, the present invention includes a color CRT monitor 25. A red video signal source 5, a green video source 7, and a blue video source 9 supply respectively red, green, and blue primary color video signals for an image to be displayed on monitor 25. A red delay module 15 is interposed between red video signal source 5 and monitor 25. Red delay module 15 introduces an arbitrary time delay, $N+t_d(red)$, into the red video signal supplied to monitor 25, where N is a baseline or reference delay, and $t_d(red)$ is a constant supplemental delay induced relative to the reference delay N. Red delay module 15 functionally introduces a corresponding phase shift $\Phi_d(red)$ associated with supplemental time delay $t_d(red)$. Red delay module 15 can be constructed to introduce any arbitrary amount of supplemental delay $t_d$ as necessary to obtain optimal reduction of emitted EMI, as will be more particularly described below. In the presently preferred embodiment, red delay module 15 introduces a supplemental time delay $t_d(red)$ equal to zero. Where no supplemental time delay $t_d(red)$ is present, the corresponding phase shift $\Phi_d(red)$ for the red video signal will, of course, also be zero.

A green delay module 17 is similarly interposed between green video supply source 7 and monitor 25. Green delay module 17 introduces an arbitrary but selectable time delay $N+t_d(green)$ into the green video signal delivered to monitor 25, where N is again the reference delay and $t_d(green)$ is a constant supplemental delay different from $t_d(red)$. A phase shift, $\Phi_d(green)$, is similarly introduced by green delay module 17 and corresponds in magnitude to the particular supplemental delay $t_d$(green) introduced. In the presently preferred embodiment, $\Phi_d$(green) is selected in such a way to produce a reduction in EMI emissions from monitor 25 beginning at a frequency one-third times the reciprocal of the supplemental time delay $t_d$(green) induced by green delay module 17, or at $f = 1/(3*t_d$ green).

Blue video signals generated from blue video signal source 9 are delayed by blue video delay module 19 interposed between blue video signal source 9 and monitor 25. Blue video delay module 19 induces an arbitrary yet selectable time delay $N + t_d$(blue) in blue video signals analogously to the delay induced in red and green video signals discussed above. As presently preferred, blue video signals are supplementally delayed by blue video delay module 19 twice as long as the green video signals, or $t_d$(blue) = $2t_d$(green), relative to the reference delay N. The reader will readily appreciate that although red video signals are "undelayed" and green and blue video signals are "delayed relative" to red, any video signal may be selected to be the undelayed reference. The remaining video signals would then be delayed relative to the chosen reference N. Thus, the reference delay N, being common to all video signals, produces no net delay. Only the $t_d$ components induced by delay modules 15, 17, and 19 contribute to the delaying of any particular video signal.

In the aggregate, the present invention displays color video images by delivering three separate video signals to monitor 25 such that:

(i) red video signals are delivered from red video signal source 5 to monitor 25 undelayed.

(ii) green video signals supplied by green video signal source 7 are delivered to monitor 25 via green delayed module 17 which induces a supplemental delay equal to $t_d$(green).

(iii) blue video signals supplied by blue video signal source 9 are delivered to monitor 25 via the delay module 19, inducing a supplemental delay equal to $t_d$(blue) = $2t_d$(green), or twice as long as the green video signal delay induced by green delay module 17.

Following delay modules 15, 17, and 19, a full color video signal will be projected upon monitor 25 with its red, green, and blue video components separated in both time and space. That is, a white video line formed of all color components in the visible spectrum would, after being processed by delay modules 15, 17, and 19, be displayed as a line with a red component shown initially, followed by a green component the same length as the red component, followed finally by a blue component following the green. Thus, a single white line has been transformed into a longer line and wherein the individual red, green, and blue components are spatially resolved. Such a result, is of course, not the desired final result for a full color CRT display. Ordinarily, it is intended that displayed color images retain the colors and hues originally generated by video signal sources 5, 7 and 9. The color separation effect of the delay modules 15, 17, and 19 can be offset by adjusting the horizontal and vertical deflection controls on monitor 25 to cause the red, green, and blue electron guns to again realign their respective electron beams so that the full color white line is again seen. The final result is that, although the individual color components of a full color image are temporally delayed with respect to one another, the spatially resolved color components are subsequently realigned using the standard monitor deflection magnets so that the individual red, green and blue colors are again integrated into a panchromatic color image. The benefit of time-delaying the constituent primary colors will now be described.

Still referring to FIG. 2, a receiving antenna 30 is shown located a large distance D away from monitor 25, where D is much greater than monitor 25 dimension "x". Receiving antenna 30 receives EMI emitted from monitor 25 during normal course of operation, which is amplified and measured by a suitable RF test instrument 31. Distance D being much greater than dimension "x" of monitor 25 ensures that the total EMI measured for monitor 25 is simply the sum of the EMI contributed by each video signal source because emissions from monitor 25 appear as a point source, rather than three independent sources. As measured by test instrument 31, total EMI for monitor 25 is reduced in an amount proportional to the amount of delay $t_d$ induced by each of the delay modules 15, 17, and 19. The total amount of delay induced for each video signal red, green, and blue, together with a resultant phase shift $\Phi_d$ in red, green, and blue video signals, produces a notched EMI output from monitor 25. The notched EMI output is a reduction in total EMI emitted by monitor 25 compared to EMI produced by undelayed video signals. Thus, delay modules 15, 17, and 19, comprise a "virtual" comb filter inserted between video signal sources 5, 7, and 9 and monitor 25.

With brief reference to FIG. 2A, delay modules 15, 17, and 19, induce a notched EMI output response as shown as measured by receiving antenna 30. FIG. 2A shows experimental EMI amplitude gain verses frequency where 0 dB is the flat unfiltered EMI generated by monitor 25. FIG. 2A shows that at particular frequency multiples, EMI measured by receiving antenna 30 is lowered between 45 and 75 dB depending on frequency, relative to the same image displayed on the same monitor 25, but where red, green, and blue video signals are not delayed.

In practice, delay modules 15, 17, and 19 may be constructed according to any of several known methods for delaying electronic signals. Exemplary methods include, for example, passing the video signal through an inductor-capacitor network acting as a low pass filter having a cut-off frequency above the maximum desired video frequency. Alternatively, an inductor-capacitor all-pass network having a flat frequency response but which induces a phase delay maybe used. Yet another alternative of inducing time delay $t_d$ is through use of a transmission line or coax cable. In practice, $t_d$ is selected to produce a series of nulls at frequency $f = 1/(3*t_d)$. Further, $t_d$ may be optimized for any CRT used for monitor 25 because video signals generated by the computer contain harmonics induced by a timing crystal in the frame buffer generating the video signals. Accordingly, harmonics, or some multiple of the particular frequency using by the timing crystal, will always be measurable in the EMI emitted from whatever CRT display is used for monitor 25.

As presently preferred, delay modules 15, 17, and 19, and the resultant supplemental time delays $t_d$, and phase shifts $\Phi_d$, are induced by inserting appropriately sized lengths of shielded electrical coax cable between respective video signal sources 5, 7, and 9 and monitor 25. Experimental results for CRT displays having video frequencies of approximately 250 MHz show significant reductions in EMI emitted from monitor 25 using cable lengths of order thirty centimeters, which produce delays of approximately one and one-half to two nanoseconds. Although red video signals are not delayed relative to green and blue video signals, a "zero delay" length of cable serves to connect between red video signal source 5 to monitor 25. To delay green video signals, a cable of approximately 30 centimeters plus the length of the cable for red video would be inserted between green video signal source 7 and monitor 25 to form "single delay" module 17, thereby inducing the delay $t_d$(green) equal to approximately 1.8 nanoseconds. Finally, to delay blue video signals, a cable of approximately 60 centimeters in addition to the length of the cable for red video would be inserted between blue video signal source 9 and monitor 25 to form "double delay" module 19, thereby inducing a delay $t_d$ (blue) of approximately 3.6 nanoseconds, or $2t_d$ (green).

Theoretically, the amount of phase shift $\Phi_d$ between any two video signals induced by delay modules 15, 17, and 19 depends on the frequencies of the video signals applied to the particular delay modules. In particular, if the frequencies of the video signals are substantially lower than $\frac{1}{3}*t_d$, the signal received by receiving antenna 30 will be essentially the same as the sum of three undelayed video signals because the time delay $t_d$ corresponds to a very small phase shift between the three color signals. For example, at a frequency equal to $1/30*t_d$, the green video signal will be delayed by 12 degrees, and the blue signal will be delayed by 24 degrees relative to the undelayed red signal. The signal amplitude as a function of the phase delay is shown by the relationship

*Signal Amplitude $_{delayed}$*=sin $(x+0)$ +sin $(x+12)$+sin $(x+24)$=2.89, or approximately 96 percent of the original amplitude. In contrast, at frequency $f=\frac{1}{3}* t_d$, the green video signal is delayed by 120 degrees, and the blue video signal is delayed by 240 degrees relative to the underlayed reference red video signal. In the second case, the three video signals cancel each other such that

*Signal Amplitude$_{delayed}$*=sin $(0)$+sin $120$+sin $240$=0, or no measurable emission at receiving antenna 30 and test instrument 31. At certain frequencies, two signals will be out of phase relative to each other with one phase remaining unaffected. At frequency $\frac{1}{2}*t_d$, for example, a green video signal video is out of phase with both the red video signal and the blue video signal: the green video signal will cancel either the red or the blue video signal leaving the remaining signal as the only video signal producing an EMI emission source. EMI received by receiving antenna 30 and measured by test instrument 31 will accordingly be one third the original amplitude,

*Signal Amplitude$_{delayed}$*=sin $(x)$+sin $(x+180)$=sin $(x+360)$=1, and

*Signal Amplitude$_{delayed}$/Signal Amplitude$_{undelayed}$*=$1/(1+1+1)=\frac{1}{3}$, or a reduction of approximately 10 dB.

As shown in the preceding paragraph, the basic concept exploited by the present invention is that supplemental time delays $t_d$ induce a phase delays $\Phi_d$ between the video signals comprising the primary color components of the color CRT system. It can be seen in FIG. 2a that the amplitude of the resulting EMI emission from monitor 25 as a function of frequency follows a variable response, very similar to the comb filter response shown previously in FIG. 1. Because the video signal components are sourced from a fixed frequency crystal oscillator, frequency spectra of EMI emissions from computer systems are well known. Accordingly, one skilled in the art can design the delay modules 15, 17, and 19 to null out or "notch" the most egregious EMI emissions by selecting appropriate time delays $t_d$ for each color video signal.

Referring now to FIGS. 3A-3D, experimental results of representative frequency response spectra for varying time delays $t_d$ for a color CRT employing the present invention are shown. For example, in FIG. 3A, a frequency response spectrum for a time delay $t_d$ between any two video signals equal to, 4.5 nanoseconds is shown. The reader should note that selection of supplemental time delay $t_d$ is not crucial for the purposes of the present invention because, as is shown in FIGS. 3A-3D the notches forming the nulls are quite broad, there being significant attenuation at frequencies fairly far from the center frequency of a particular notch. Similarly, frequency response spectra for time delays $t_d$ between any two video signals equal to 2.5, 3, and 3.5 nanoseconds, is shown respectively in FIGS. 3B-3D.

Occasionally, for purposes of a particular CRT system, delays significantly in excess of a few nanoseconds maybe required. Greater time delays can be induced by inserting appropriate discrete components in the nature of resistors capacitors and inductors in the CRT frame buffer, rather than inserting increasingly cumbersome lengths of cable within the monitor housing. The discrete components may, for example, be used as a suitably adjusted low pass filter, serving as delay modules 15, 17, and 19. Alternatively, a digital timer or clock of a known type may be inserted between video signal sources 5, 7, and 9 and monitor 25 to achieve delay times as may be appropriate for the particular CRT.

The foregoing has disclosed methods and apparatus for reducing EMI in CRT video display systems. The present invention permits a significant reduction in measurable EMI as measured by standard reference antennas for purposes of monitor certification. Reduction of EMI emissions may be tailored for particular CRT systems by choosing time delays so that harmful frequency and harmonics thereof may be nulled or notched out. Although the present invention has been described with particular reference to FIGS. 1-3 and with emphasis on inducing time delays using lengths of cable inserted between video signal source and the monitor, it should be understood that the figures are for illustration only and should not be taken as limitations upon the invention. It is contemplated that changes and modifications may be made by one of ordinary skill in the art to the materials and arrangements of the elements of the present invention without departing from the spirit and scope of the invention.

I claim:

1. An electromagnetic interference ("EMI") reduction system for reducing total EMI emission produced by a video display system, said video display system including a video generator for generating a plurality of undelayed primary color video signals and a color cathode ray tube ("CRT") for displaying a plurality of video images, said EMI reduction system comprising:
   video signal delay means coupled to said video generator for producing a plurality of delayed primary color video signals delayed in time relative to said undelayed primary color video signals, said video signal delay means further producing a multiplicity of phase delays between said undelayed primary color video signals and said delayed primary color video signals, and video signal reconvergence means coupled to said CRT for reconverging said multiplicity of delayed primary color video signals into an output composite video signal, said phase delays producing a multiplicity of EMI mimima such that said total EMI emission produced by said video display system when said video images are displayed on said CRT using said composite video signal is reduced relative to when said video images are displayed using undelayed primary color video signals.

2. The EMI reduction system as set forth in claim 1, wherein said video signal delay means comprises a length of electrically conductive wire.

3. The EMI reduction system as set forth in claim 2, wherein said video signal delay means comprises a length of coax cable.

4. The EMI reduction system as set forth in claim 1, wherein said video signal delay means comprises a low pass filter.

5. The EMI reduction system as set forth in claim 4, wherein said low pass filter comprises a plurality of discrete resistors and capacitors.

6. The EMI reduction systems as set forth in claim 4, wherein said low pass filter comprises a plurality of discrete resistors and inductors.

7. The EMI reduction systems as set forth in claim 4, wherein said low pass filter comprises a plurality of discrete capacitors and inductors.

8. The EMI reduction system as set forth in claim 1, wherein said video signal delay means comprises a comb filter.

9. The EMI reduction system as set forth in claim 1, wherein said video signal delay means comprises a digital timer.

10. The EMI reduction system as set forth in claim 1, wherein said video signal reconvergence means comprises first and second electron beam deflection circuits.

11. The video signal reconvergence means as set forth in claim 10, wherein said first electron beam deflection circuit comprises a horizontal deflection plate assembly.

12. The video signal reconvergence means as set forth in claim 10, wherein said second electron beam deflection circuit comprises a vertical deflection plate assembly.

13. An electromagnetic interference ("EMI") reduction system for reducing total EMI emission produced by a video display system, said EMI reduction system comprising:

a video generator for generating a plurality of undelayed primary color video signals;

display means including a CRT coupled to said video generator for displaying a plurality of video images;

video signal delay means coupled to said video generator for producing a plurality of delayed primary color video signals delayed in time relative to said undelayed primary color video signals, said video signal delay means further producing a multiplicity of phase delays between said undelayed primary color video signals and said delayed primary color video signals; and video signal reconvergence means coupled to said CRT for reconverging said multiplicity of delayed primary color video signals into an output composite video signal, said phase delays producing a multiplicity of EMI mimima such that said total EMI emission produced by said video display system when said video images are displayed on said CRT using said composite video signal is reduced relative to when said video images are displayed using undelayed primary color video signals.

14. The EMI reduction system as set forth in claim 13, wherein said video signal delay means comprises a length of electrically conductive wire.

15. The EMI reduction system as set forth in claim 14, wherein said video signal delay means comprises a length of coax cable.

16. The EMI reduction system as set forth in claim 14, wherein said video signal delay means comprises a low pass filter.

17. The EMI reduction system as set forth in claim 16, wherein said low pass filter comprises a plurality of discrete resistor and capacitors.

18. The EMI reduction system as set forth in claim 14, wherein said video signal delay means comprises a plurality of discrete resistors and inductors.

19. The EMI reduction system as set forth in claim 14, wherein said video signal delay means comprises a plurality of discrete capacitors and inductors.

20. The EMI reduction system as set forth in claim 13, wherein said video signal delay means comprises a digital timer.

21. The EMI reduction system as set forth in claim 13, wherein said video signal delay means comprises a comb filter.

22. The EMI reduction system as set forth in claim 13, wherein said video signal reconvergence means comprises first and second electron beam deflection circuits.

23. The video signal reconvergence means as set forth in claim 22, wherein said first electron beam deflection circuit comprises a horizontal deflection plate.

24. The video signal reconvergence means as set forth in claim 22, wherein said second electron beam deflection circuit comprises a vertical deflection plate.

25. An electromagnetic interference ("EMI") reduction system for reducing total EMI emission produced by a video display system, said EMI reduction system comprising:

first, second and third primary color video generators for generating respectively first, second and third undelayed primary color video signals;

display means including a CRT coupled to said primary color video generators for displaying a plurality of color video images;

first, second and third electrically conductive wires coupled respectively between said first, second and third primary color video generators and said display means, said first, second and third electrically conductive wires producing respectively first, second and third delayed primary color video signals delayed in time relative to said first, second and third undelayed primary color video signals, said first, second and third electrically conductive wires further producing first, second and third phase delays between said first, second and third undelayed primary color video signals and said first, second and third delayed primary color video signals; and horizontal and vertical electron beam deflection assemblies coupled to said CRT for reconverging said first, second and third delayed primary color video signals into an output composite video signal, said first, second and third phase delays producing a multiplicity of EMI mimima such that said total EMI emission produced by said video display system when said video images are displayed on said CRT using said composite video signal is reduced relative to when said video images are displayed using said undelayed primary color video signals.

26. The EMI reduction system as set forth in claim 25, wherein said first, second and third electrically conductive wires comprise first, second and third lengths of coax cable.

27. The EMI reduction system as set forth in claim 26, wherein said first, second and third lengths of coax cable are of unequal dimension.

28. A method for reducing total electromagnetic interference ("EMI") emission produced by a video display system, said video display system including a video generator for generating a plurality of undelayed primary color video signals and a color cathode ray tube ("CRT") for displaying a plurality of video images, said method comprising the steps of:
producing a plurality of delayed primary color video signals delayed in time relative to said undelayed primary color video signals;
producing a multiplicity of phase delays between said undelayed primary color video signals and said delayed primary color video signals, and
reconverging said multiplicity of delayed primary color video signals into an output composite video signal, said phase delays producing a multiplicity of EMI mimima such that when said video images are displayed on said CRT using said composite video signal said total EMI emission produced by said video display system is reduced relative to when said video images are displayed using undelayed primary color video signals.

29. The method as set forth in claim 28, wherein producing a plurality of delayed primary color video signals comprises providing a length of electrically conductive wire.

30. The method as set forth in claim 29, wherein producing a plurality of delayed primary color video signals comprises providing a length of coax cable.

31. The method as set forth in claim 28, wherein producing a plurality of delayed primary color video signals comprises low pass filtering said undelayed primary color video signals.

32. The method as set forth in claim 28, wherein producing a plurality of delayed primary color video signals is accomplished by a digital timer.

33. The method as set forth in claim 28, wherein producing a plurality of delayed primary color video signals comprises comb filtering said undelayed primary color video signals.

34. The method as set forth in claim 28, wherein reconverging said multiplicity of delayed primary color video signals into an output composite video signal comprises providing first and second electron beam deflection circuits.

35. The method as set forth in claim 34, wherein providing said first electron beam deflection circuit further comprises the step of horizontally deflecting the CRT electron beam.

36. The method as set forth in claim 34, wherein providing said second electron beam deflection circuit further comprises the step of vertically deflecting the CRT electron beam.

37. A method for reducing total electromagnetic interference ("EMI") emission produced by a video display system, said method comprising the steps of:
providing display means including a CRT for displaying a plurality of color video images;
providing first, second and third primary color video generators for generating respectively first, second and third undelayed primary color video signals;
providing first, second and third electrically conductive wires coupled respectively between said first, second and third primary color video generators and said display means to produce respectively first, second and third delayed primary color video signals delayed in time relative to said first, second and third undelayed primary color video signals, producing further first, second and third phase delays between said first, second and third undelayed primary color video signals and said first, second and third delayed primary color video signals; and
providing horizontal and vertical electron beam deflection assemblies coupled to said CRT for reconverging said first, second and third delayed primary color video signals into an output composite video signal, said first, second and third phase delays producing a multiplicity of EMI mimima such that said total EMI emission produced by said video display system when said video images are displayed on said CRT using said composite video signal is reduced relative to when said video images are displayed using said undelayed primary color video signals.

38. The method as set forth in claim 37, wherein said first, second and third electrically conductive wires comprise first, second and third lengths of coax cable.

39. The method as set forth in claim 38, wherein said first, second and third lengths of coax cable are of unequal dimension.

* * * * *